L. W. CHUBB.
PLATE FOR ELECTROLYTIC CELLS.
APPLICATION FILED APR. 4, 1917.

1,348,206.

Patented Aug. 3, 1920.
2 SHEETS—SHEET 1.

WITNESSES:
Fred A. Lind.
R D Brown

INVENTOR
Lewis W. Chubb
BY
ATTORNEY

L. W. CHUBB.
PLATE FOR ELECTROLYTIC CELLS.
APPLICATION FILED APR. 4, 1917.

1,348,206.

Patented Aug. 3, 1920.

2 SHEETS—SHEET 2.

WITNESSES:

INVENTOR
Lewis W. Chubb
BY
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA.

PLATE FOR ELECTROLYTIC CELLS.

1,348,206.    Specification of Letters Patent.    Patented Aug. 3, 1920.

Application filed April 4, 1917. Serial No. 159,656.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Plates for Electrolytic Cells, of which the following is a specification.

My invention relates to electrolyte cells such as condensers, lightning arresters, rectifiers and the like and it has for its object an improved electrode structure for cells of the character indicated which shall be mechanically rigid and strong and which shall present a large superficial area to the action of the electrolyte of the cell.

Figure 1:
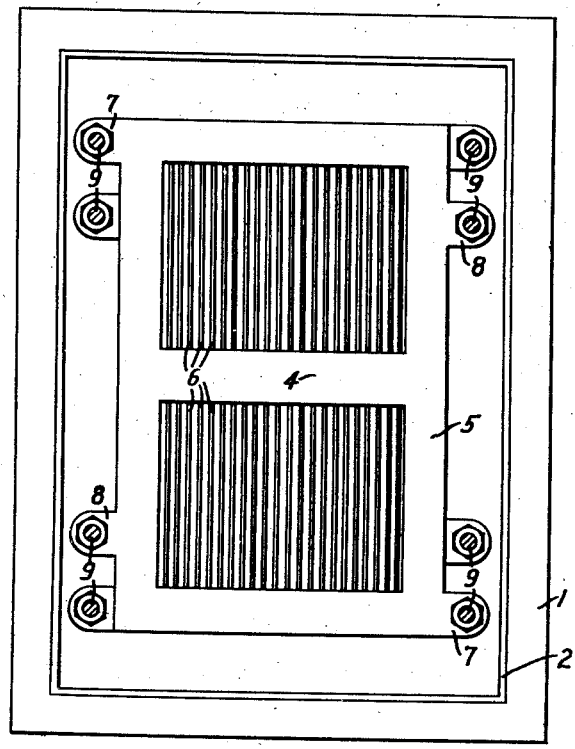
Figure 2:
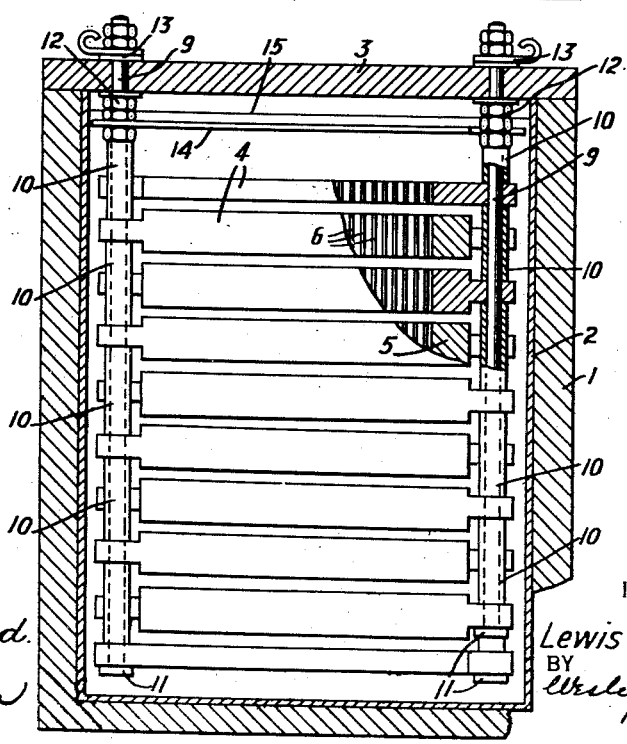
Figure 3:
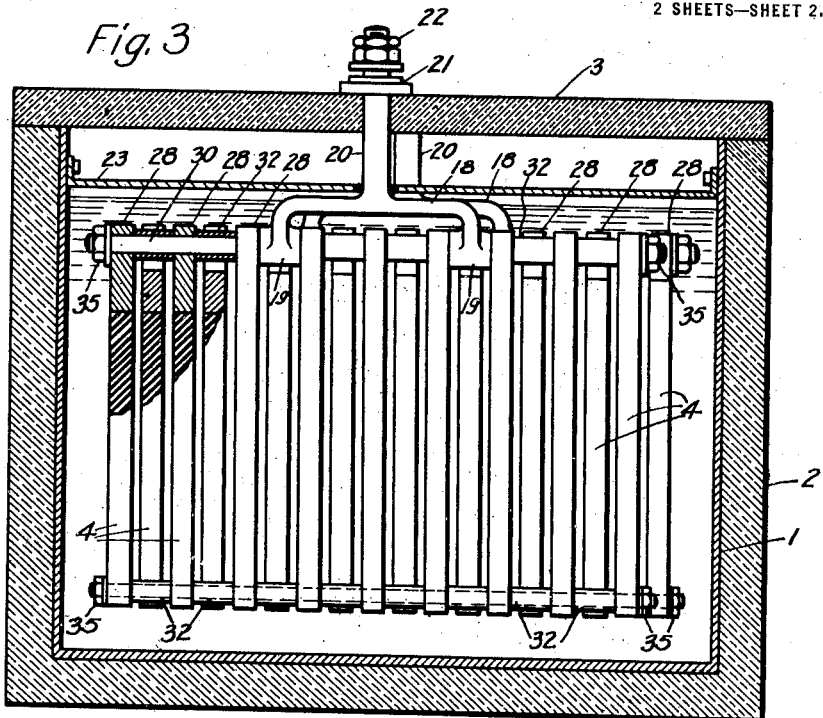
Figure 4:
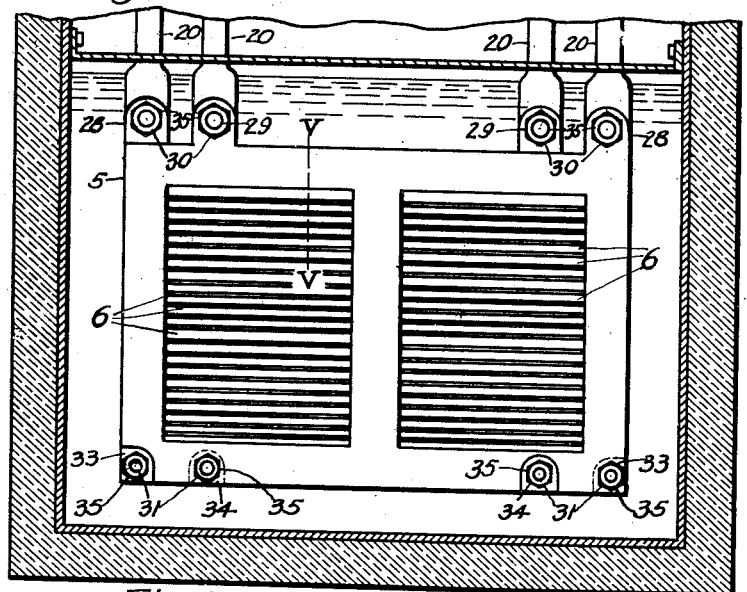
Figure 5:
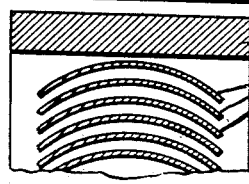

In the accompanying drawing, Figure 1 is a plan view of a cell provided with horizontal electrode plates constructed in accordance with my invention, the cover of the cell being removed to show the upper plate. Fig. 2 is a side view, partially in elevation and partially in vertical section, of the structure of Fig. 1. Fig. 3 is a side view, partially in elevation and partially in longitudinal section, showing an electrolytic cell provided with vertical plates constructed in accordance with my invention. Fig. 4 is an end view of the cell of Fig. 3, partially in elevation and partially in section, showing the side of one of the plates of the cell and Fig. 5 is an enlarged fragmentary sectional view of a portion of a plate of a modified construction, the section being taken substantially along the line V—V, Fig. 4.

Electrolytic cells provided with polarizing electrodes of aluminum, magnesium, tantalum or other film-forming metal require for their most effective operation that the active area of the electrodes shall be as large as possible in proportion to the dimensions of the cell. Such cells are therefore commonly provided with electrodes composed of thin sheet metal disposed parallel to one another in alternate sets, the adjacent plates being set as closely together as the mechanical characteristics of the cell will permit. The plates must, of course, be separated by sufficient intervals to prevent them from touching and also to prevent the passage of short-circuiting currents between the plates when the cells are subjected to operating potentials, which may amount to several hundred volts.

According to my present invention, I provide a plate structure for electrolytic cells consisting of a large number of strips of aluminum, or other filming metal, of such width as to greatly increase the superficial area of the plate in proportion to its outer dimensions and arranged parallel to one another in a frame of the same material. Since the adjacent strips are always of the same polarity, they may be set as close together as desired, it being only necessary that sufficient space be left between the adjacent strips to provide current-conducting paths of low resistance and to permit the circulation of electrolyte and the proper formation of polarizing films.

The cell shown in Figs. 1 and 2 of the accompanying drawing comprises a container 1 provided with a lining 2 of aluminum or other suitable material and with a cover 3 from which is suspended a set of horizontal plates 4 constructed in accordance with my invention. Each of the plates 4 consists of a frame 5 which may be suitably composed of cast aluminum and which is provided with one or more rectangular openings in which are disposed a considerable number of parallel aluminum strips or ribbons 6. These strips may be secured to the frame 5 in any suitable manner. For example, their ends may be cast in the frame, the strips being first assembled upon a temporary support within a properly shaped mold, molten aluminum being poured into the mold and embedding the ends of the strips, and suitable precautions being taken to prevent overheating of the molten aluminum and consequent burning of the thin metal composing the strips. The strips may also be attached to the frame by pressing their ends into transverse saw cuts, or they may be held in place by suitable wedges or other fasteners.

An equivalent electrode construction may also be produced by forming a large number of parallel slots in a plate of filming material. This may be conveniently done by providing a gang-milling tool having the several cutters set closely together, and slotting the plate by means of the gang cutter, first from one side of the plate to cut the slots about half way through the plate and then from the other side to complete the slots. In this manner, an aluminum plate one-half an inch in thickness can be provided with slots as narrow as twenty-five thousandths of an inch, separated by strips of metal of the same thickness.

Each of the plates 5 is provided with outwardly projecting perforated lugs 7 at two diagonal corners and with two other projecting lugs 8 which are formed on or attached to the edges of the plate at a little distance from the two remaining corners. The plates are superposed in the manner shown in Fig. 2, alternate plates being turned end for end, with the result that the four lugs on each set of alternate plates are directly in line with the similar lugs on the plates of the same set and are displaced from the lugs upon the plates of the other set. This arrangement is clearly shown in Fig. 1. The plates of each set are connected by means of vertical rods 9, each of which extends through all of the corresponding lugs in one set of alternate plates and through spacing sleeves 10 which serve to maintain the plates 5 in proper spaced relation.

The rods 9 are provided, at their lower ends, with flanges or supporting nuts 11, upon which rest the lower plates of each set, and the upper ends of the rods 9 extend through the cover 3, suitable clamping nuts 12 being provided to insure the rigid attachment of the supporting rods to the cover. Terminal devices 13 are attached to the upper ends of two of the rods 9 belonging to the sets of plates of opposite polarity. A splash-plate 14, suitably composed of aluminum, is provided above the upper plate 4 and may conveniently be supported by one set of four vertical rods 9, the plate 14 being, for this purpose, provided with four perforations of the proper size to admit the four supporting rods, and with four larger perforations which are of such size and location as to surround the spacing sleeves 10 surrounding the rods 9 of opposite polarity. The splash-plate 14 may suitably be located below the surface 15 of the electrolyte, in which case the agitation of the electrolyte caused by violent movements of the container is effectively damped and the resulting strains upon the electrode plates is reduced to a minimum.

Figs. 3 and 4 show a modified form of cell in which the electrode plates 4 are suspended vertically and in which the strips 6 of which each plate is composed are set obliquely in the frame 5, a construction which enables the strips to be of maximum width in proportion to the thickness of the frame 5. The strips may, if desired, be set perpendicular to the sides of the frame.

Fig. 5 shows a further modification of plate construction in which longitudinally curved strips 6ª are set within the frame 5, the curved form of the strips rendering them more rigid than the flat strips shown in Figs. 1 and 2. A similar result may be obtained by bending the strips lengthwise into V shape, thereby increasing their effective width in proportion to the width of the frame opening in which they are received.

The frame 5 may suitably be about one-half inch in thickness and the width of the strips 6 and 6ª is selected in accordance with the thickness of the frame. The plates may be suspended in the electrolyte in any suitable manner. As shown, the upper edge of each of the plates is provided with two lugs 28 and 29, the lugs 28 being disposed at one corner of the plate and the lugs 29 being disposed at some distance from the corner opposite the lugs 28. The lugs 28 and 29 are perforated to receive supporting rods 30 and the lower edges of the plates are perforated to receive similar supporting rods 31. Spacing sleeves 32 are supported upon the rods 30 and 31 in order to maintain the plates at the proper distances apart and the alternate plates are provided with corner notches 33 and with intermediate notches 34 surrounding the spacing sleeves 32. The supporting rods 30 and 11 are screw-threaded at their ends to receive clamping nuts 35 by means of which the entire plate structure is rigidly secured in its assembled position.

For suspending the assembled plates from the cover 3, stirrups 18 are secured to sleeve members 19 which surround the supporting rods 10 between certain of the plates 4 and the stirrups 18 are suspended from rods 20 which extend through openings in the cover 3 and are provided with suitable suspension nuts and gaskets 21 and with terminal devices 22 for the attachment of line conductors. A splash plate 23 is preferably disposed just above the electrodes of the cell, and this splash-board may either be attached to the walls of the container, in which case it should be disposed above the upper line of the electrolyte, or it may be supported upon the suspension members 20 or the stirrups 18, in which case it should be disposed below the surface of the electrolyte.

The structural details which I have shown and described may be variously modified without exceeding the limits of my invention and it is to be understood that my invention is not restricted to such structural details but is limited only by the scope of the appended claims.

I claim as my invention:

1. An electrode for electrolytic condensers, lightning arresters, rectifiers and the like comprising a frame of relatively thick film-forming material provided with an opening and a plurality of relatively thin strips of film-forming material extending across the opening with their ends embedded in opposite sides of the frame.

2. An electrode for electrolytic condensers, lightning arresters, rectifiers and the like comprising a frame of relatively thick film-forming material provided with an opening, and a plurality of relatively thin strips of film-forming material extending across the opening with their ends embedded in opposite sides of the frame, the strips being disposed in substantially parallel planes at an angle to the plane of the frame with their longitudinal edges disposed in substantially the planes of the opposite faces of the frame.

3. An electrode for electrolytic condensers, lightning arresters, rectifiers and the like comprising a frame of film-forming material having an opening and a plurality of strips of film-forming material curved transversely throughout their length extending across the opening in closely spaced relation and having their ends embedded in opposite sides of the frame.

4. An electrode for electrolytic condensers, lightning arresters, rectifiers and the like comprising a frame of relatively thick film-forming material provided with an opening, and a plurality of relatively thin sheets of film-forming material extending across the opening in closely adjacent, substantially parallel planes at right angles to the general plane of the frame.

5. An electrode for electrolytic condensers, lightning arresters, rectifiers and the like comprising a frame of relatively thick film-forming material provided with an opening and a plurality of relatively thin sheets of film-forming material extending across the opening in closely adjacent, substantially parallel planes at right angles to the general plane of the frame, the longitudinal edges of the strips being substantially disposed in the planes of the opposite faces of the frame.

6. An electrolytic condenser comprising a container and a plurality of electrode members supported within the container and substantially parallel to its base, each electrode member being provided with rectangular strips of filming material disposed at an angle to the general plane of the electrode member.

7. An electrolytic condenser comprising a container and a plurality of electrode members within the container supported substantially parallel to its base and provided with a plurality of closely spaced strips of filming material disposed substantially at right angles to the general plane of the electrode members.

In testimony whereof, I have hereunto subscribed my name this 3rd day of April, 1917.

LEWIS W. CHUBB.